(12) United States Patent
Xia et al.

(10) Patent No.: US 10,913,021 B2
(45) Date of Patent: Feb. 9, 2021

(54) WATER PURIFICATION DEVICE

(71) Applicant: The Johns Hopkins University, Baltimore, MD (US)

(72) Inventors: Zhiyong Xia, Rockville, MD (US); Brad M. Ward, Frederick, MD (US)

(73) Assignee: The Johns Hopkins University, Baltimore, MD (US)

(*) Notice: Subject to any disclaimer, the term of this patent is extended or adjusted under 35 U.S.C. 154(b) by 278 days.

(21) Appl. No.: 15/285,534

(22) Filed: Oct. 5, 2016

(65) Prior Publication Data

US 2017/0203244 A1   Jul. 20, 2017

Related U.S. Application Data

(60) Provisional application No. 62/279,853, filed on Jan. 18, 2016.

(51) Int. Cl.
| | | |
|---|---|---|
| *B01D 39/16* | (2006.01) | |
| *B01D 39/20* | (2006.01) | |
| *C02F 1/00* | (2006.01) | |
| C02F 101/20 | (2006.01) | |
| C02F 101/36 | (2006.01) | |

(52) U.S. Cl.
CPC ..... *B01D 39/1623* (2013.01); *B01D 39/2041* (2013.01); *C02F 1/001* (2013.01); *B01D 2239/025* (2013.01); *B01D 2239/0258* (2013.01); *B01D 2239/0442* (2013.01); *C02F 2101/20* (2013.01); *C02F 2101/36* (2013.01); *C02F 2201/008* (2013.01); *C02F 2303/04* (2013.01); *C02F 2303/20* (2013.01); *C02F 2305/08* (2013.01)

(58) Field of Classification Search
CPC .............................................. B01D 2239/065
See application file for complete search history.

(56) References Cited

U.S. PATENT DOCUMENTS

| | | | | |
|---|---|---|---|---|
| 6,136,189 A * | 10/2000 | Smith | ...................... | C02F 1/002 210/266 |
| 8,002,990 B2 * | 8/2011 | Schroeder | .............. | B01D 15/00 210/266 |
| 2003/0042201 A1 * | 3/2003 | Sizelove | ................ | A61K 35/02 210/639 |
| 2008/0149561 A1 * | 6/2008 | Chu | ....................... | A61L 15/425 210/500.38 |
| 2010/0291213 A1 * | 11/2010 | Berrigan | .................. | D04H 1/42 424/484 |
| 2012/0267314 A1 * | 10/2012 | Minton-Edison | ....... | C02F 1/002 210/695 |

(Continued)

OTHER PUBLICATIONS

Yang et al., Alumina nanofibers grafted with functional groups, Oct. 2009, Water Research vol. 44, pp. 741-750 (Year: 2009).*

(Continued)

*Primary Examiner* — Patrick Orme
(74) *Attorney, Agent, or Firm* — Noah J. Hayward

(57) ABSTRACT

A water purification device includes a heavy metal removal layer configured to remove heavy metal ions and perfluorinated compounds from contaminated water. The water purification device may further include a biological species removal layer configured to remove biological species from the contaminated water and a support layer configured to provide support for the water purification device.

17 Claims, 12 Drawing Sheets

(56) References Cited

U.S. PATENT DOCUMENTS

2013/0081992 A1* 4/2013 Chavanne ............. B01D 27/14
                                                    210/323.1

OTHER PUBLICATIONS

Sereshti et al., Electrospun PET nanofibers as a new absorbent for micro-solid phase extraction of chromium (VI) in environmental water sample, Oct. 2015, pp. 89195-89203 (Year: 2015).*

Min et al., Functionalized chitosan electrospun nanofiber for effective removal of trace arsenate from water, Aug. 2016, pp. 1-12 (Year: 2016).*

Hejazi et al., Electrospun nanofibrous composite membranes of chitosan/PVA-PAN, Nov. 2014, pp. 1959-1966 (Year: 2014).*

Cummings et al., Recommendation on Perfluorinated compound treatment options for drinking water, Jun. 2015, pp. 1-12 (Year: 2015).*

Botes et al., The potential of nanofibers and nanobiocides in water purification, Jan. 2010, Critical Reviews in Microbiobiology, vol. 36, pp. 68-81 (Year: 2010).*

Du et al. Adsorption behavior and mechanism of perfluorinated compounds on various adsorbents, Apr. 2014, Journal of Hazardous Materials, vol. 274, pp. 443-454, (Year: 2014).*

CDC, A Guide to Drinking Water Treatment Technologies for Household use, Mar. 2014, pp. 1-3 (Year: 2014).*

\* cited by examiner

| Sample condition | Thiol level by Ellman test (μmole/mg filter) | Nominal target ion concentration (ppb) | As | Cd | Pb | Cu | Hg |
|---|---|---|---|---|---|---|---|
| pH of dirty influent water | -- | 1000 | 7.1 | 4.3 | 3.9 | 4.6 | 0.5 |
| Toluene (none catalyzed) | 18.5 | 1000 | 34% | 67% | 87% | 64% | 99% |
| H₂O/HCl (acid catalyzed) | 27.6 | 1000 | 39% | 43% | 37% | 20% | 100% |
| EtOH/HCl (acid catalyzed) | 27.8 | 1000 | 43% | 99% | 97% | 51% | 99% |
| EtOH/HCl (acid catalyzed) | 27.8 | 100 | 99% | 72% | 72% | 88% | 99% |

WATER PURIFICATION DEVICE

CROSS-REFERENCE TO RELATED APPLICATIONS

This application claims priority to and the benefit of U.S. Provisional Application Ser. No. 62/279,853 filed on Jan. 18, 2016, the entire contents of which are hereby incorporated herein by reference.

STATEMENT OF GOVERNMENTAL INTEREST

This invention was made with Government support under contract number N00024-13-D-6400 awarded by the Naval Sea Systems Command (NAVSEA). The Government has certain rights in the invention.

TECHNICAL FIELD

Example embodiments relate generally to water purification devices, and more particularly to water purification devices that can filter heavy metals, perfluorinated compounds and biological species.

BACKGROUND

A number of contaminants contribute to the pollution of water sources. These contaminants include a) biological species, such as disease causing bacteria; b) toxic heavy metal ions, such as lead, mercury, arsenic, cadmium, and copper; and c) organic contaminants, such as perfluorinated compounds ("PFCs") that include perfluorooctane sulfonate ("PFOS") and perfluorooctanoic acid ("PFOA"). Biological species tend to cause acute illness, and toxic heavy metal ions tend to accumulate in complex organs such as the liver, heart, and brain to cause serious illness from long-term exposure. The presence of PFOS and PFOA in the human blood is also particularly concerning as they have been found in greater than 90% of the U.S. population and may lead to cancer, liver damage, or birth defects. Moreover, due to the chemical nature of PFOS and PFOA, they are extremely difficult to remove from water. Existing techniques used to purify water include reverse osmosis ("RO"), activated carbon, micro-/nano-filtration membranes, ion exchange resins, iodine, bleach, ultra-violet lights, and mixed oxidants such as sodium hypochlorite. Unfortunately these existing technologies are only effective in removing one type of contaminant (i.e., they are configured to efficiently remove only one of biological species, heavy metals, or PFCS). For example, for the removal of heavy metal ions, common used techniques include RO, filtration, distillation, and nano-metal oxides. These techniques, however, suffer from low removal efficiency and poor selectivity issues. For the removal of PFCs, common used techniques include activated carbon, membrane filtration, ion exchange, and oxidation. All four methods, however, suffer from low removal rate, high cost, and poor selectivity. For the removal of biological species, chemical disinfectants (such as iodine, bleach and sodium hypochlorite) may be used, but they may exert odor to the water.

BRIEF SUMMARY OF SOME EXAMPLES

In one example embodiment, a water purification device is provided. The water purification device may include a heavy metal removal layer configured to remove heavy metal ions from contaminated water. The water purification device may further include a biological species removal layer configured to remove biological species from the contaminated water and a support layer configured to provide support for the water purification device.

BRIEF DESCRIPTION OF THE SEVERAL VIEWS OF THE DRAWING(S)

Having thus described the vehicle in general terms, reference will now be made to the accompanying drawings, which are not necessarily drawn to scale, and wherein:

FIGS. 5-7 illustrate charts demonstrating the percentage of heavy metal ion removal using the nanofiber web of the heavy metal removal layer according to an example embodiment;

DETAILED DESCRIPTION

Figure 1:
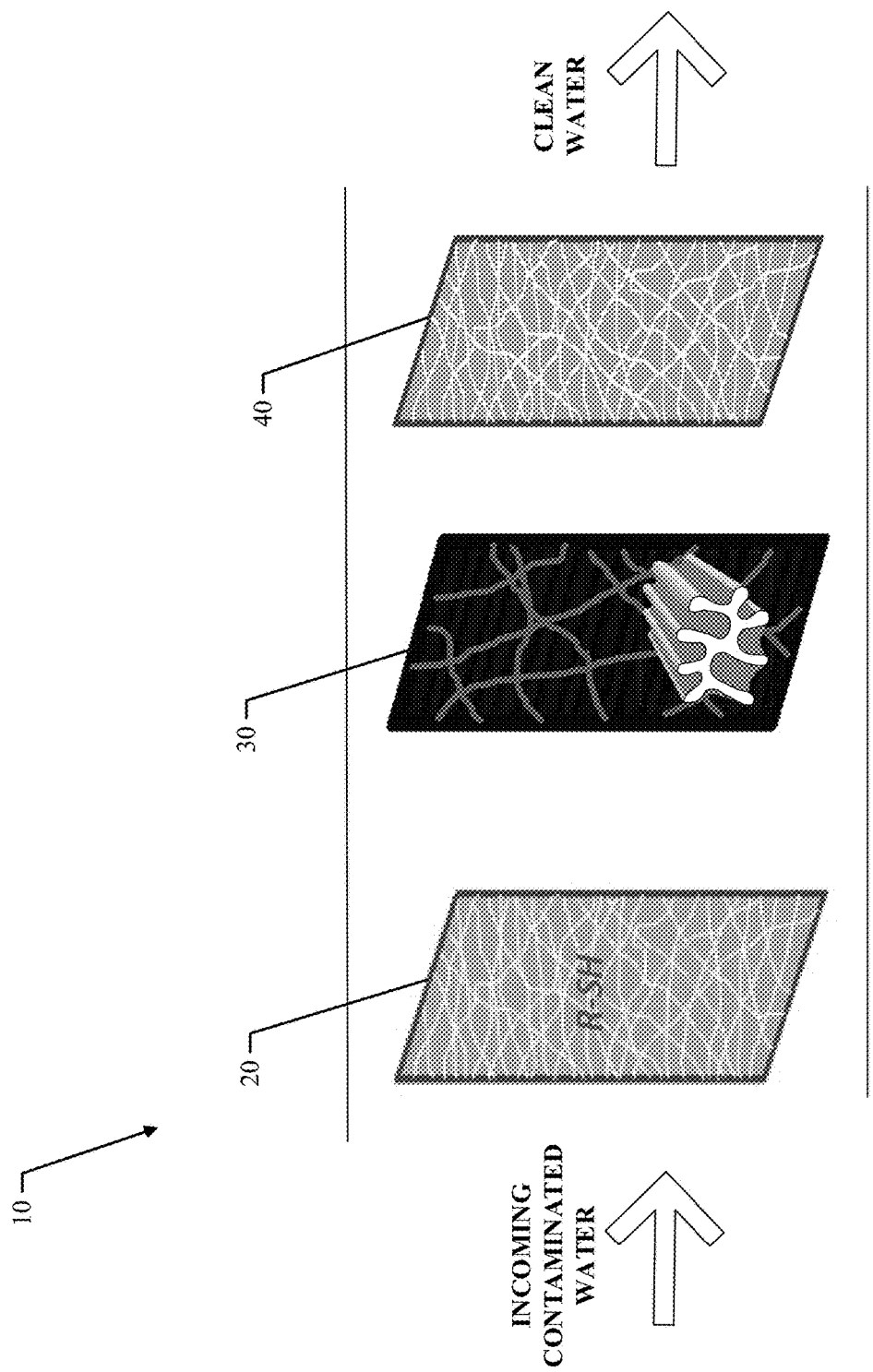
FIG. 1 illustrates an exploded view of the water purification device according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

Example embodiments described herein relate to a water purification device that is configured to remove heavy metal ions and biological species from contaminated water. Moreover, in some cases, the water purification device may also remove PFCs from the contaminated water. The water may come from a variety of sources including rivers, ponds, swamps, wells, or the like. As described above, in the past in order to filter one of heavy metal ions, biological species, and PFCS from contaminated water, different treatment technologies have been needed (e.g., for heavy metals: RO, filtration, distillation, and nano-metal oxides; for biological species: chemical disinfectants (such as iodine, bleach, and sodium hypochlorite); and for PFCs: activated carbon, membrane filtration, ion exchange, and oxidation). These known technologies for removing each of heavy metal ions, biological species, and PFCs are highly incompatible. In other words, because these technologies are incompatible (i.e., having different and competing chemistry), one filtration device has been unable to filter out heavy metal ions, biological species, and PFCs from contaminated water. Accordingly, example embodiments described herein relate to a water purification device that may perform multiple functions, such as removing each of heavy metal ions, PFCs, and biological species from contaminated water.

Therefore, the water purification device described herein may have a high selectivity toward heavy metal ions and PFCs while maintaining a high surface charge to filter out biological species. Moreover, the water purification device may be cost-effective as the water purification device may require less energy or pressure to ensure high filtration efficiency. Additionally, the water purification device may have a high specific surface area while maintaining high filtration efficiency at high porosity levels. Furthermore, since the device does not employ free disinfecting chemicals, the filtered water will not have any unpleasant odors or tastes. Moreover, the water purification device described herein may be incorporated into portable water purification systems, vehicle-based water filtration systems, or any other filtration system known in the art.

The term "nonwoven", as used herein, may comprise a web having a structure of individual fibers or threads which are interlaid, but not in an identifiable manner as in a knitted or woven fabric. Non-woven webs have been formed by many processes such as, for example, meltblowing processes, spunbonding processes, hydroentangling, air-laid, and bonded carded web processes.

The term "pore", as used herein, may comprise any structure formed by the nonwoven fiber fabric assembly having a maximal pore size. The random arrangement of the nonwoven fibers may create irregular pore structures. Thus, the pores may have irregular shapes and inconsistent sizes generally. As such, the pore size should be understood to correlate to the size of the smallest object that would be retained by or prevented from passing through the pore.

The term "embedded", as used herein, may generally refer to the placement and capture of nanoparticles within nanofiber web either secured within the nanofiber web or on the surface of the nanofiber web.

In one aspect, a water purification device suitable for a wide variety of end-uses is provided. Water purification devices, according to some example embodiments herein, may include many features including the ability to remove both biological species and heavy metal ions, and in some cases PFCs, from contaminated water while being configured to be incorporated into existing water purification systems. In general, the water purification device may include at least a layer configured to remove biological species, a layer configured to remove heavy metal ions, and a layer configured to provide support to the water purification device.

FIG. 1 illustrates an exploded view of the water purification device according to an example embodiment. As shown in FIG. 1, the water purification device 10 may include a plurality of layers. In some cases, the water purification device 10 may include a heavy metal removal layer 20, a support layer 30, and a biological species removal layer 40. According to one example embodiment, the support layer 30 may be disposed between the biological species removal layer 40 and the heavy metal removal layer 20. In some cases, the support layer 30 may be sandwiched between (i.e., located directly between, without other layers disposed between, the biological species removal layer 40 and the heavy metal removal layer 20). However, in other example embodiments, the support layer 30 may be located on an end of the water purification device 10 and either of the biological species removal layer 40 or the heavy metal removal layer 20 may be sandwiched between the support layer 30 and the other of the biological species removal layer 40 or the heavy metal removal layer 20. Moreover, in some cases, the heavy metal removal layer 20 may located on or proximate a first end of the water purification device 10 such that the contaminated water is first filtered through the heavy metal removal layer 20. However, according to further example embodiments, the contaminated water may be first filtered through the biological species layer 40 and then through the heavy metal removal layer 20.

The heavy metal removal layer 20 of the water purification device 10 may be configured to remove heavy metal ions from the contaminated water. Moreover, in accordance with other example embodiments, the heavy metal removal layer 20 may be configured to remove both heavy metal ions and PFCs. In some cases, the heavy metal removal layer 20 may be a nonwoven having a functional group bonded thereto. The nonwoven of the heavy metal removal layer 20, therefore, may include a randomly oriented or aligned collection of nanofibers. In some embodiments, for example, the nonwoven of the heavy metal removal layer 20 may be a nanofiber web in the form of a thick and tangled mass defined by an open texture or porosity. According to certain embodiments, for instance, the nanofiber web of the heavy metal removal layer 20 may be formed using an electrospinning production process. In such embodiments, the morphologies of the nanofiber web of the heavy metal removal layer 20 may be arbitrarily controlled using different electrospinning settings. In other embodiments, for example, the nanofiber web of the heavy metal removal layer 20 may be formed using additive manufacturing means.

In accordance with an example embodiment, the nanofiber web of the heavy metal removal layer 20 may include polymer-based fibers. Accordingly, the nanofiber web of the heavy metal removal layer 20 may include only one polymer or a blend of polymers. The polymer or blend of polymers may be a synthetic polymer such as poly(lactic acid) ("PLA"), poly(L-lactic acid) ("PLLA"), poly(lactic-co-glycolic acid) ("PLGA"), polycaprolactone ("PCL"), poly(ethylene oxide) ("PEO"), poly(ethylene terephthalate) ("PET"), poly(vinyl alcohol) ("PVA"), or any combination thereof. In certain embodiments, for example, the nanofiber web may include only PET nanofibers.

Further, the nanofiber web of the heavy metal removal layer 20 may include a fiber diameter from about 5 nanometers ("nm") to about 2000 nanometers ("nm"). In further embodiments, for example, the nanofiber web of the heavy metal removal layer 20 may include a fiber diameter from about 100 nm to about 1000 nm. In other embodiments, for instance, the nanofiber web of the heavy metal removal layer 20 may include a fiber diameter from about 200 nm to about 750 nm. In some embodiments, for example, the nanofiber web of the heavy metal removal layer 20 may include a fiber diameter of about 500 nm. As such, in certain embodiments, the nanofiber web of the heavy metal removal layer 20 may include a fiber diameter from at least about any of the following: 5, 50, 100, 200, 300, 400, and 500 nm and/or at most about 2000, 1000, 750, 700, 600, and 500 nm (e.g., about 100-700 nm, about 400-600 nm, etc.).

Moreover the nanofiber web of the heavy metal removal layer 20 may include a plurality of pores (i.e., a pore structure) configured for efficient interaction between heavy metal ions and/or PFCs and the nanofiber web for best removal rate. Accordingly, the pore size and the shape, as well as how the pores are interconnected, may at least partially determine the types of heavy metal ions and/or PFCs that may be removed from the contaminated water. In some cases, the plurality of pores may have a relatively small pore size thus resulting in a high specific surface area. Accordingly, the nanofiber web of the heavy metal removal layer 20 may include a pore size from about 100 nm to about 50,000 nm. In further embodiments, for example, the nanofiber web of the heavy metal removal layer 20 may include a pore size from about 200 nm to about 6000 nm. In other embodiments, for instance, the nanofiber web of the heavy metal removal layer 20 may include a pore size from about 300 nm to about 5000 nm. In certain embodiments, for example, the nanofiber web of the heavy metal removal layer 20 may include a pore size from about 500 nm to about 1000 nm. As such, in certain embodiments, the nanofiber web of the heavy metal removal layer 20 may include a pore size from at least about any of the following: 100, 200, 300, 400, and 500 nm and/or at most about 50,000, 10,000, 7000, 6000, 5000, 3000, 2000, 1000, and 500 nm (e.g., about 100 nm-1000 nm, about 500 nm-1000 nm, etc.).

While the pore size of the nanofiber web of the heavy metal removal layer 20 may contribute to the removal of at least some of the heavy metal ions and/or PFCs from the contaminated water, in some cases, the nanofiber web of the heavy metal removal layer 20 may also include a functional group attached thereto to further increase the removal efficiency of the heavy metal ions and/or PFCs from the contaminated water. Thus, the nanofiber web of the heavy metal removal layer 20 may maintain a high specific surface area while being able to filter out a high percentage of the heavy metal ions and/or PFCs from the contaminated water. Because the heavy metal removal layer 20 may have a high specific surface area, less pressure may be needed to enable the removal efficiency of the contaminants from the water. Thereby, any system that the water purification device 10 may be utilized in will require less energy or pressure thereby reducing the costs associated with purifying the contaminated water.

The functional group bonded to the nanofiber web of the heavy metal removal layer 20 may be any functional group capable of attracting and binding heavy metals ions thus increasing the removal efficiency of the heavy metal removal layer 20. In some cases, as shown in FIG. 1, the functional group may be a thiol or a mercaptan (R-SH) functional group. Moreover, in some example embodiments, the thiol functional group may be introduced under different solvent conditions (e.g., acid, base, neutral, ethanol/HCl, $H_2O$/HCl, NH4OH, or toluene). In some cases, the thiol functional group may be introduced with the use of mercaptan silane. The mercaptan silane may be any type of mercaptan silane such as 3-mercaptopropyltrimethoxysilane ("MPTMS"), 11-mercaptoundecyltrimethoxysilane, S-(octanoyl) mercaptopropyltriethoxysilane, 3-mercaptopropylmethyldimethoxysilane, (mercaptomethyl)methyldiethoxysilane, and 3-mercaptopropylmethyldimethoxysilane.

In accordance with an example embodiment herein, the thiol level present on the nanofiber web of the heavy metal removal layer 20 may be from about 5 to 100 µmole/mg of nanofiber web. In further embodiments, for example, the thiol level present on the nanofiber web of the heavy metal removal layer 20 may be from about 5 to 50 µmole/mg of nanofiber web. In other example embodiments, for example, the thiol level present on the nanofiber web of the heavy metal removal layer 20 may be from about 5 to 20 µmole/mg of nanofiber web. As such, in certain embodiments, the thiol level present on the nanofiber web of the heavy metal removal layer 20 may be from at least about any of the following: 5, 8, 10, 12, 15, and 20 µmole/mg of nanofiber web and/or at most about any of the following: 100, 80, 75, 60, 50, 35, 25, and 20 µmole/mg of nanofiber web.

As further shown in FIG. 1, the water purification device 10 may also include a biological species removal layer 40 that is configured to remove biological species from contaminated water. In such embodiments, for instance, the biological species removal layer 40 may be a nonwoven. In some cases, the biological species removal layer 40 may include a plurality of nano-whiskers formed into a nonwoven web or mat. In accordance with some example embodiments, the nano-whiskers may be bonded to a microglass non-woven scaffold in order to form a nonwoven. The nano-whiskers may be formed according to any process known in the art.

Accordingly, the nonwoven of the biological species removal layer 40 may include a fiber diameter from about 10 nm to about 2000 nm. In further embodiments, for example, the nonwoven of the biological species removal layer 40 may include a fiber diameter from about 100 nm to about 1000 nm. In other embodiments, for instance, the nonwoven of the biological species removal layer 40 may include a fiber diameter from about 250 nm to about 750 nm. In some embodiments, for example, the nonwoven of the biological species removal layer 40 may include a fiber diameter of about 500 nm. As such, in certain embodiments, the nonwoven of the biological species removal layer 40 may include a fiber diameter from at least about any of the following: 80, 100, 250, 300, 400, and 500 nm and/or at most about 2000, 1000, 750, 700, 600, and 500 nm (e.g., about 100-700 nm, about 400-600 nm, etc.).

In accordance with an example embodiment, the nano-whiskers of the nonwoven of the biological species removal layer 40 may be formed from any suitable material capable of imparting a positive charge on a surface of the biological species removal layer 40. In some cases, for example, the nano-whiskers may be aluminum oxide hydroxide (AlOOH) nano-whiskers. In accordance with further example embodiments, the nano-whiskers may be AlOOH in the boehmite form. The biological species removal layer 40, therefore, may rely at least partially on the positive charge of the nano-whiskers when contacted with water in order to remove the contaminants rather than, for example, solely on the pore size of the nonwoven of the biological species removal layer 40. In other words, biological contaminants or species may be mainly negatively charged under most conditions. Accordingly, the biological species removal layer 40, via the electroadhesion process, may utilize the positively-charged nano-whiskers of the biological species removal layer 40 in order to filter negatively-charged biological species from the contaminated water. In some cases, however, the biological species layer 40 may rely on a combination of both the positive charge of the nano-whiskers and the pore size of the nonwoven of the biological species removal layer 40 in order to filter out biological species from the contaminated water.

Accordingly, the nanofiber web of the biological species removal layer 40 may include a plurality of pores (i.e., a pore structure) configured to filter out at least some of the biological species. Accordingly, the pore size may at least partially determine the types of biological species that may be removed from the contaminated water. In some cases, the plurality of pores may have a relatively large pore size thus resulting in a high specific surface area. Accordingly, the nonwoven of the biological species removal layer 40 may include a pore size from about 100 nm to about 7000 nm. In further embodiments, for example, the nonwoven of the biological species removal layer 40 may include a pore size from about 200 nm to about 6000 nm. In other embodiments, for instance, the nonwoven of the biological species removal layer 40 may include a pore size from about 300 nm to about 5000 nm. In certain embodiments, for example, the nonwoven of the biological species removal layer 40 may include a pore size from about 500 nm to about 1000 nm. As such, in certain embodiments, the nonwoven of biological species removal layer 40 may include a pore size from at least about any of the following: 100, 200, 300, 400, and 500 nm and/or at most about 7000, 6000, 5000, 3000, 1000, and 500 nm (e.g., about 100 nm-1000 nm, about 500 nm-1000 nm, etc.).

As further shown in FIG. 1, the water purification device 10 may also include a support layer 30 that is configured to provide support and structure to the water purification device 10. In such embodiments, for instance, the support layer 30 may be a nonwoven that includes a randomly oriented or aligned collection of microfibers. In some embodiments, for example, the microfiber web of the support layer 30 may be in the form of a thick and tangled mass defined by an open texture or porosity. According to some example embodiments, the microfibers of the support layer 30 may be deep groove microfibers to promote capillary action on the surface of the support layer 30. In further example embodiments, the microfibers of the support layer 30 may be micron-sized deep groove microfibers.

In accordance with an example embodiment, the microfiber web of the support layer 30 may include polymer-based fibers. Accordingly, the microfiber web of the support layer 30 may include only one polymer or a blend of polymers. The polymer or blend of polymers may be a synthetic polymer such as poly(lactic acid) ("PLA"), poly(L-lactic acid) ("PLLA"), poly(lactic-co-glycolic acid) ("PLGA"), polycaprolactone ("PCL"), poly(ethylene oxide) ("PEO"), poly(ethylene terephthalate) ("PET"), poly(vinyl alcohol) ("PVA"), or any combination thereof. In other cases, the microfiber web of the support layer 30 may include fibers formed from a combination of a polymer and glass (e.g., fiberglass).

Furthermore, the microfiber web of the support layer 30 may include a fiber diameter from about 0.5 µm to about 200 µm. In further embodiments, for example, the microfiber web of the support layer 30 may include a fiber diameter from about 0.5 µm to about 100 µm. In other embodiments, for instance, the microfiber web of the support layer 30 may include a fiber diameter from about 0.5 µm to about 50 µm. In some embodiments, for example, the microfiber web of the support layer 30 may include a fiber diameter of about 10 µm. As such, in certain embodiments, the microfiber web of the support layer 30 may include a fiber diameter from at least about any of the following: 0.5, 1, 2, 3, 4, 5, and 10 µm and/or at most about 200, 100, 50, 40, 30, 20, and 10 µm (e.g., about 2 µm-100 µm, about 4 µm-100 µm, etc.).

Moreover, the microfiber web of the support layer 30 may include a plurality of pores (i.e., a pore structure) configured to allow the water to pass through and, in some cases, to filter out large particulates in the water. In some cases, the plurality of pores may have a relatively large pore size thus resulting in a high specific surface area. Accordingly, the microfiber web of the support layer 30 may include a pore size from about 2 nm to about 7000 nm. In further embodiments, for example the microfiber web of the support layer 30 may include a pore size from about 50 nm to about 6000 nm. In other embodiments, for instance, the microfiber web of the support layer 30 may include a pore size from about 100 nm to about 5000 nm. In certain embodiments, for example, the microfiber web of the support layer 30 may include a pore size from about 500 nm to about 1000 nm. As such, in certain embodiments, the microfiber web of the support layer 30 may include a pore size from at least about any of the following: 2, 50, 100, 200, 300, 400, and 500 nm and/or at most about 7000, 6000, 5000, 3000, 1000, and 500 nm (e.g., about 100 nm-1000 nm, about 500 nm-1000 nm, etc.).

Figure 2:
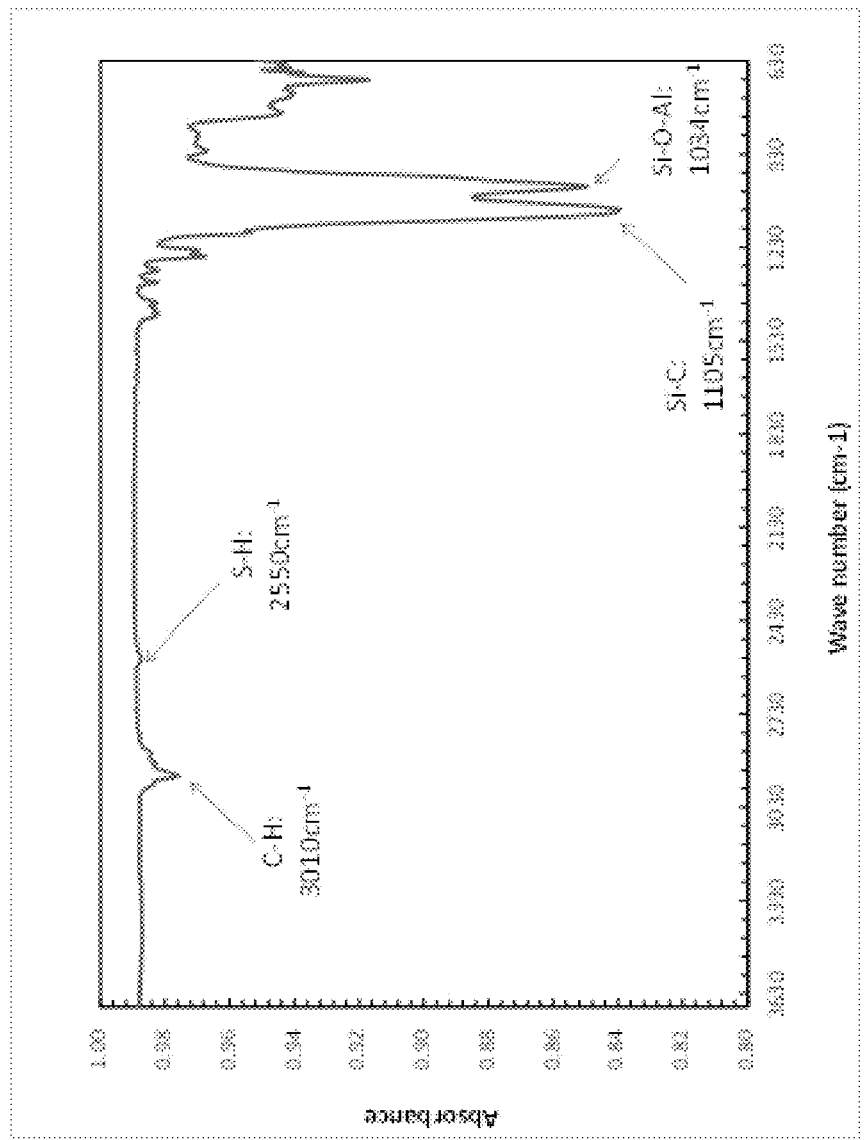
FIG. 2 illustrates a graph demonstrating the introduction of the thiol functional group onto the surface of the nanofiber web of the heavy metal removal layer according to an example embodiment.

FIG. 2 illustrates a graph demonstrating the introduction of the thiol functional group onto the surface of the nanofiber web of the heavy metal removal layer 20. As shown in FIG. 2, an FTIR trace graph shows the presence of the thiol functional group at 2250 cm$^{-1}$ and several other characteristic absorption bands. Based on the FTIR analysis demonstrated in the graph, the thiol functional group has been introduced on to the surface of the nanofiber web of the heavy metal removal layer 20.

Figure 3:
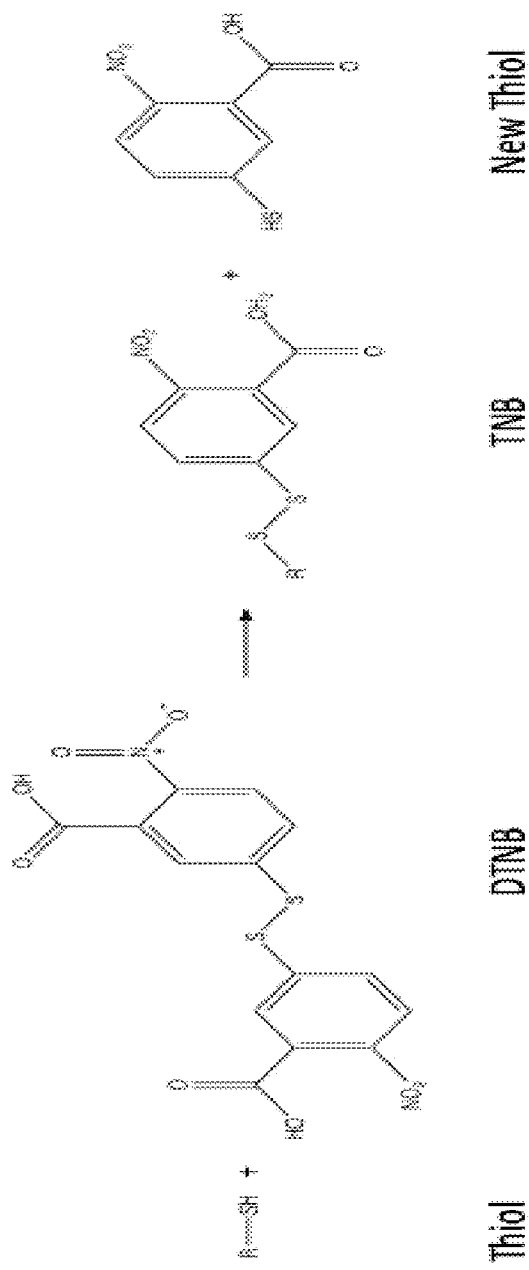
FIG. 3 illustrates reaction chemistry used to quantify the concentration of the thiol functional group on the nanofiber web of the heavy metal removal layer according to an example embodiment.

FIG. 3 illustrates reaction chemistry used to quantify the concentration of the thiol functional group on the nanofiber web of the heavy metal removal layer 20. As shown in FIG. 3, the Ellman reagent (5,5'-dithiobis-(2-nitrobenzoic acid ("DTBN")) is reacted with thiol to result in 2-nitoro-5-thiobenzoic acid ("TNB"). Accordingly, the Ellman reagent may be used to quantify the thiol concentration introduced on the surface of the nanofiber web of the heavy metal removal layer 20.

Figure 4:
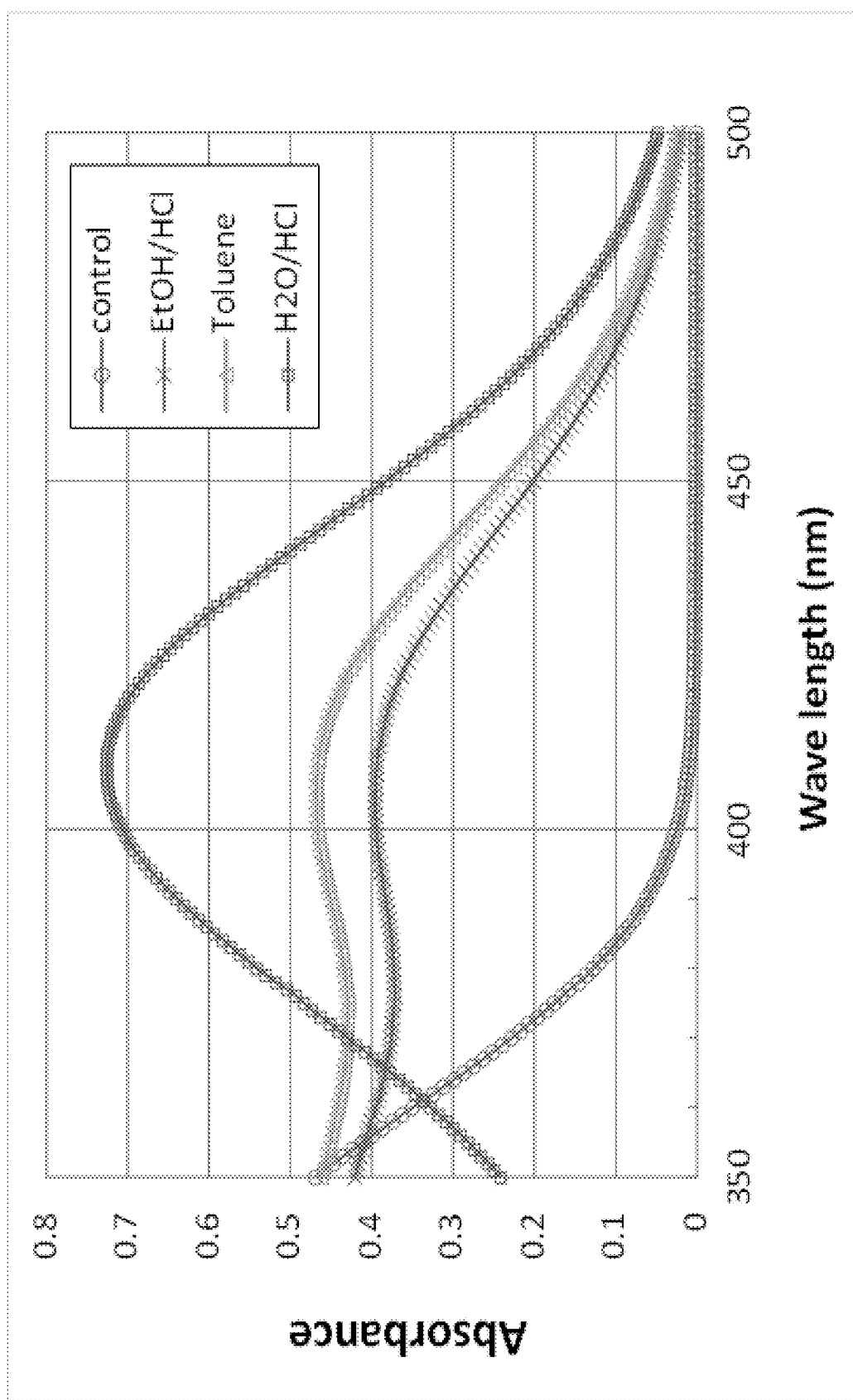
FIG. 4 illustrates a graph demonstrating the level of the thiol functional group on the nanofiber web of the heavy metal removal layer according to an example embodiment.

FIG. 4 illustrates a graph demonstrating the level of the thiol functional group on the nanofiber web of the heavy metal removal layer 20. As shown in FIG. 4, a UV-Vis absorption spectrum illustrates the level of the thiol functional group on the nanofiber web of the heavy metal removal layer 20, where the thiol has been treated under different conditions. It should be understood that the peak at 412 nm may be used to quantify the amount of the thiol functional group on the nanofiber web of the heavy metal removal layer 20. Accordingly, in some cases, thiol-ethanol (EtOH/HCl) may have approximately 0.4 absorbance. Moreover, for example, thiol-toluene may have approximately 0.45 absorbance. Additionally, for example, thiol-water (H$_2$O/HCl) may have 0.75 absorbance.

Figure 6:
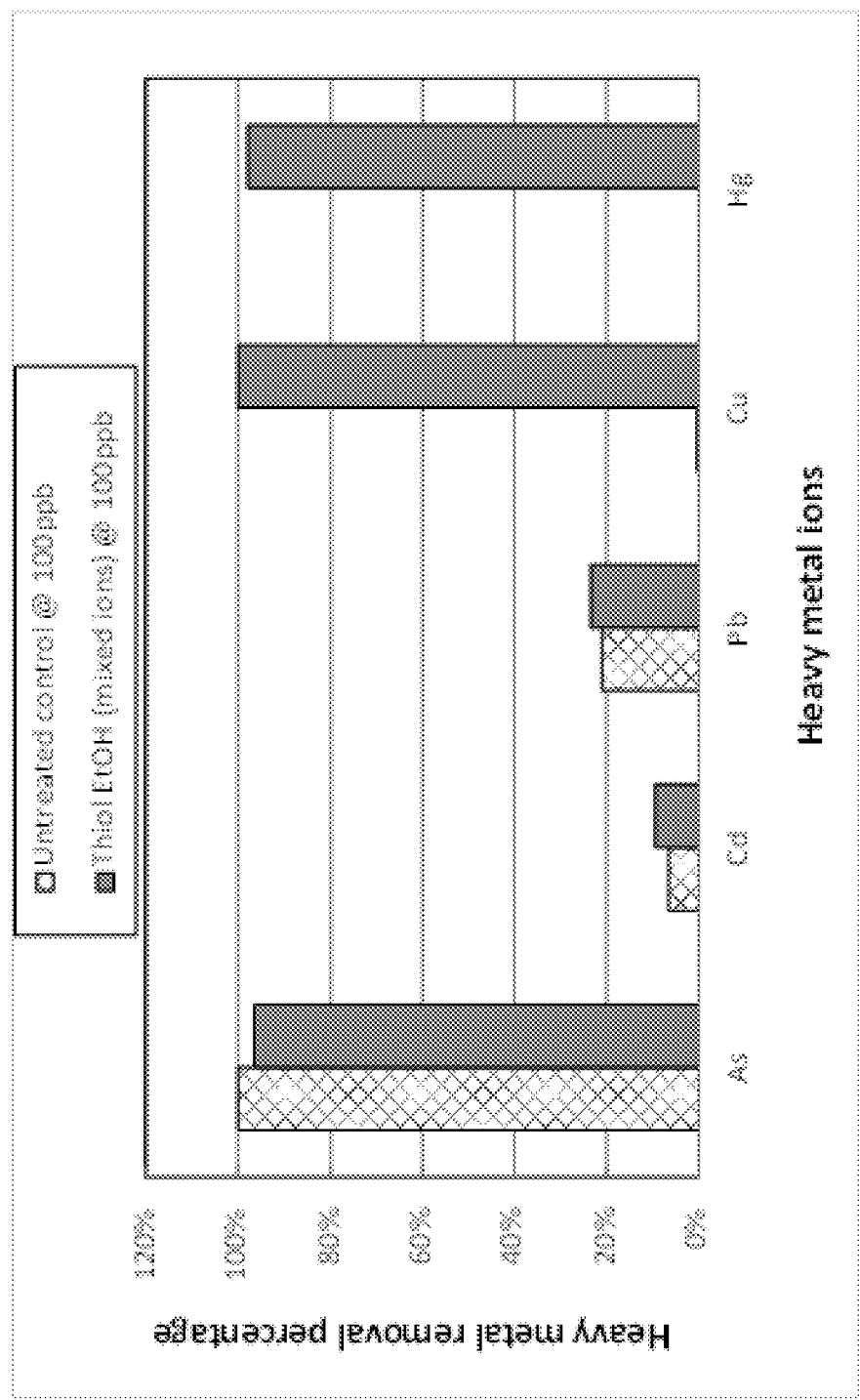
Figure 7:
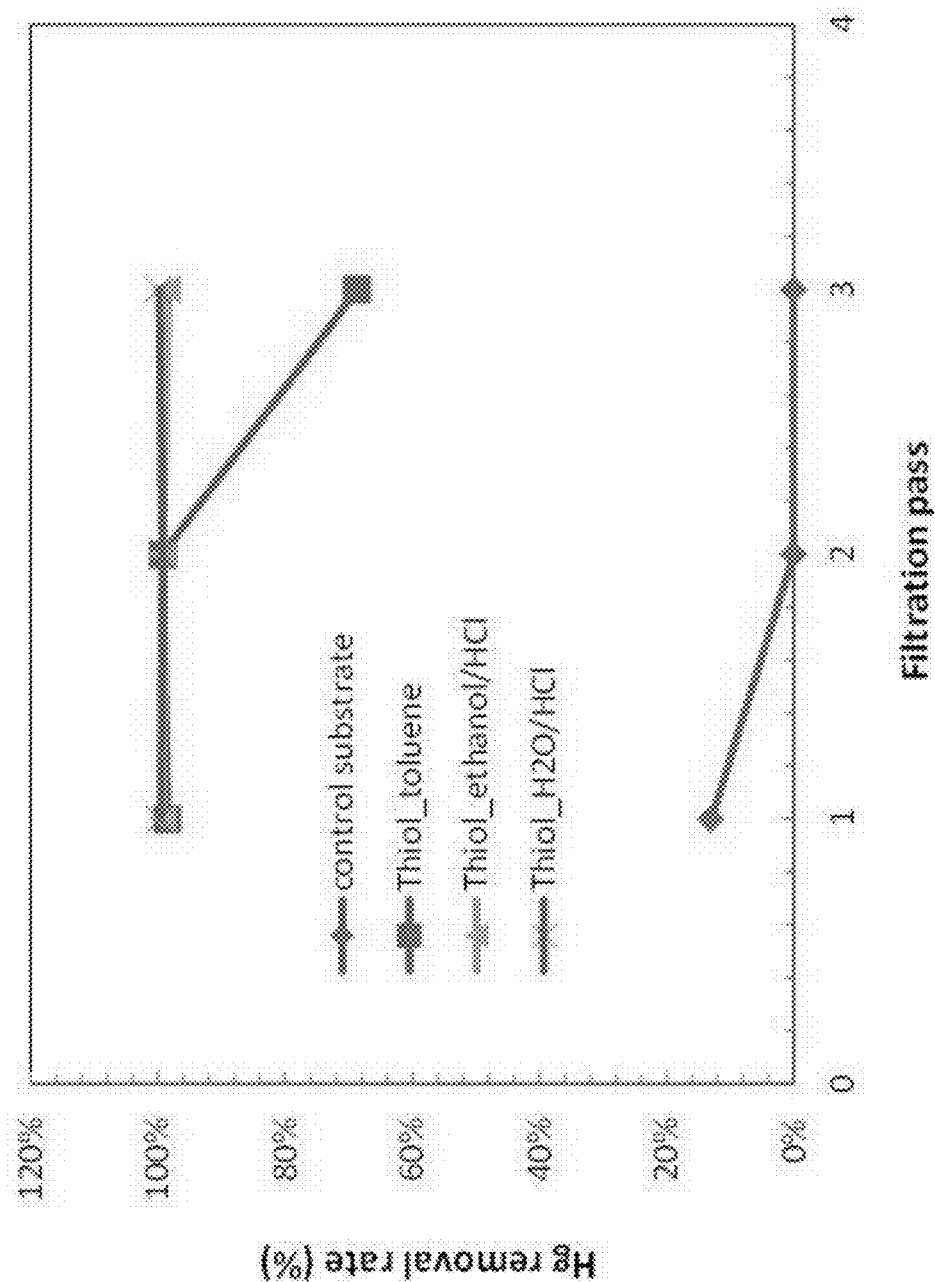

FIGS. 5-7 illustrate charts demonstrating the percentage of heavy metal ion removal using the nanofiber web of the heavy metal removal layer 20. As shown in FIG. 5, water was contaminated with only one heavy metal ion at a time, such as arsenic, cadmium, lead, copper, and mercury. Moreover, three conditions were evaluated for introducing the thiol functional group onto the nanofiber web of the heavy metal removal layer 20: 1) toluene (neutral condition); 2) H2O/HCl (acid catalyzed); and 3) EtOH/HCl (acid catalyzed). The heavy metal removal rate was calculated by comparing the heavy metal concentration in the influent and the heavy metal ion concentration in the effluent. It should be understood that a higher removal value indicates a better heavy metal removal rate.

As shown in FIG. 6, the water was contaminated with a combination of heavy metal ions including arsenic, cadmium, lead, copper, and mercury. The concentration of all the heavy metal ions in the water is 100 ppb. It should be understood that all tests were performed at a pH of 2.98, as a low pH may be needed for maintaining the adequate solubility of mercury in the water. Moreover, the thiol was treated with EtOH/HCl (acid catalyzed). As is demonstrated in the results of FIG. 6, the addition of the thiol functional group to the nanofiber web of the heavy metal removal layer 20 results in increased efficiency when removing any of arsenic, cadmium, lead, copper, or mercury from water.

As shown in FIG. 7, water was contaminated with mercury. Moreover three conditions were evaluated for introducing the thiol functional group onto the nanofiber web of the heavy metal removal layer 20: 1) toluene (neutral condition); 2) H2O/HCl (none catalyzed); and 3) EtOH/HCl (acid catalyzed). It should be understood that all tests were performed at a pH of 0.5, as a low pH may be needed for maintaining the adequate solubility of mercury in the water. As demonstrated in FIG. 7, the addition of the thiol functional group to the nanofiber web of the heavy metal removal layer 20 results in increased efficiency when removing mercury from the water. Moreover, even after repeated passes through the heavy metal removal layer 20, the heavy metal removal layer 20 continues to be effective at removing mercury from the water.

Figure 8:
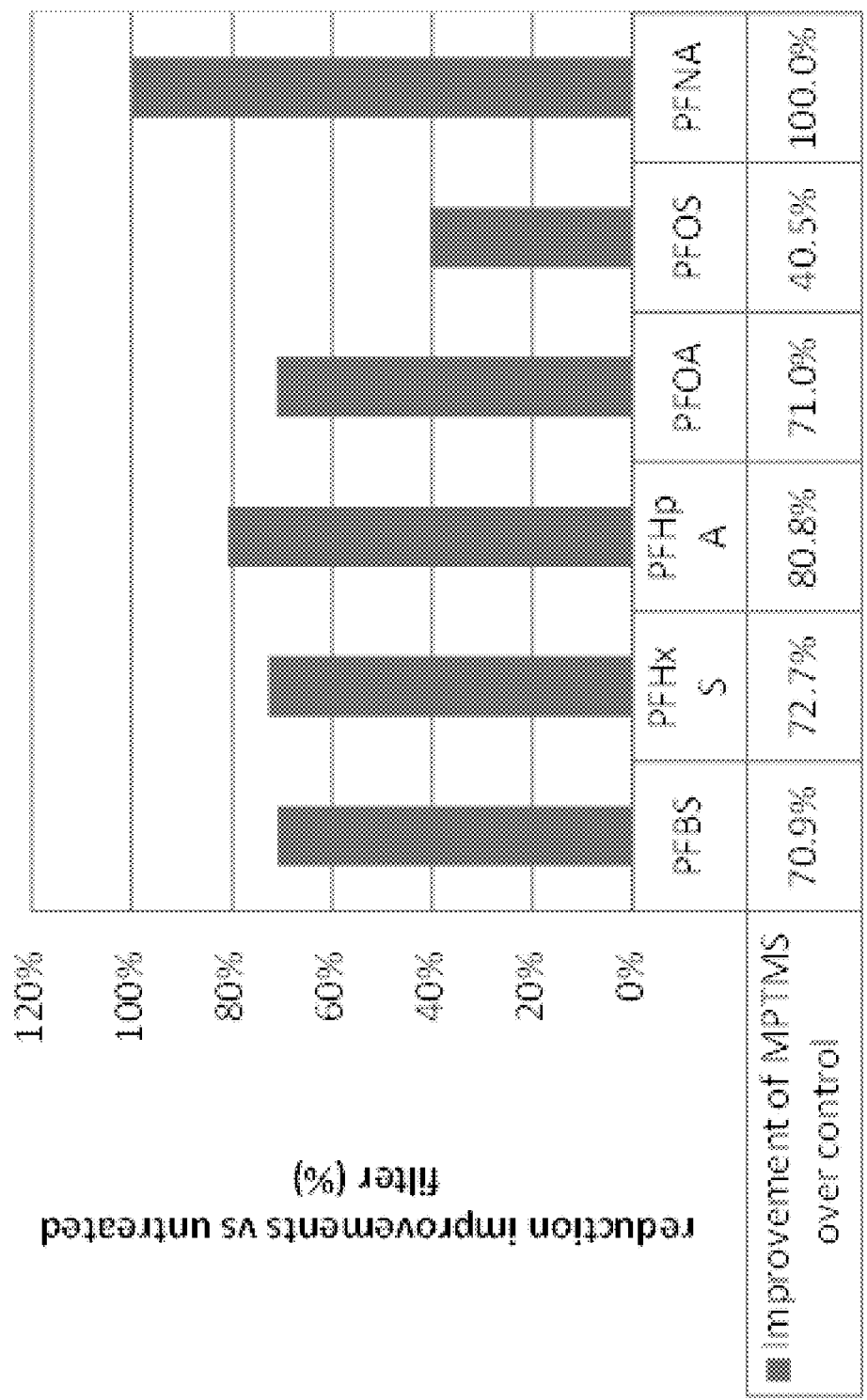
FIG. 8 illustrates a chart demonstrating the percentage of PFC removal using the nanofiber web of the heavy metal removal layer according to an example embodiment.

FIG. 8 illustrates a chart demonstrating the percentage of PFC removal using the nanofiber web of the heavy metal removal layer 20. As shown in FIG. 8, water was contaminated with only one PFC at a time, such as perfluorobutanesulfonic acid ("PFBS"), perfluorohexane sulfonate ("PFHXS"), perfluoroheptanoate ("PFHp A"), PFOS, PFOA, and perfluorononanoic acid ("PFNA"). Moreover, the thiol functional group was introduced with the use of MPTMS. As is demonstrated in the results of FIG. 8, the addition of the thiol functional group to the nanofiber web of the heavy metal removal layer 20 results in increased efficiency when removing any PFBS, RFHXS, PFHp A, PFOA, PFOS, or PFNA.

Figure 9:
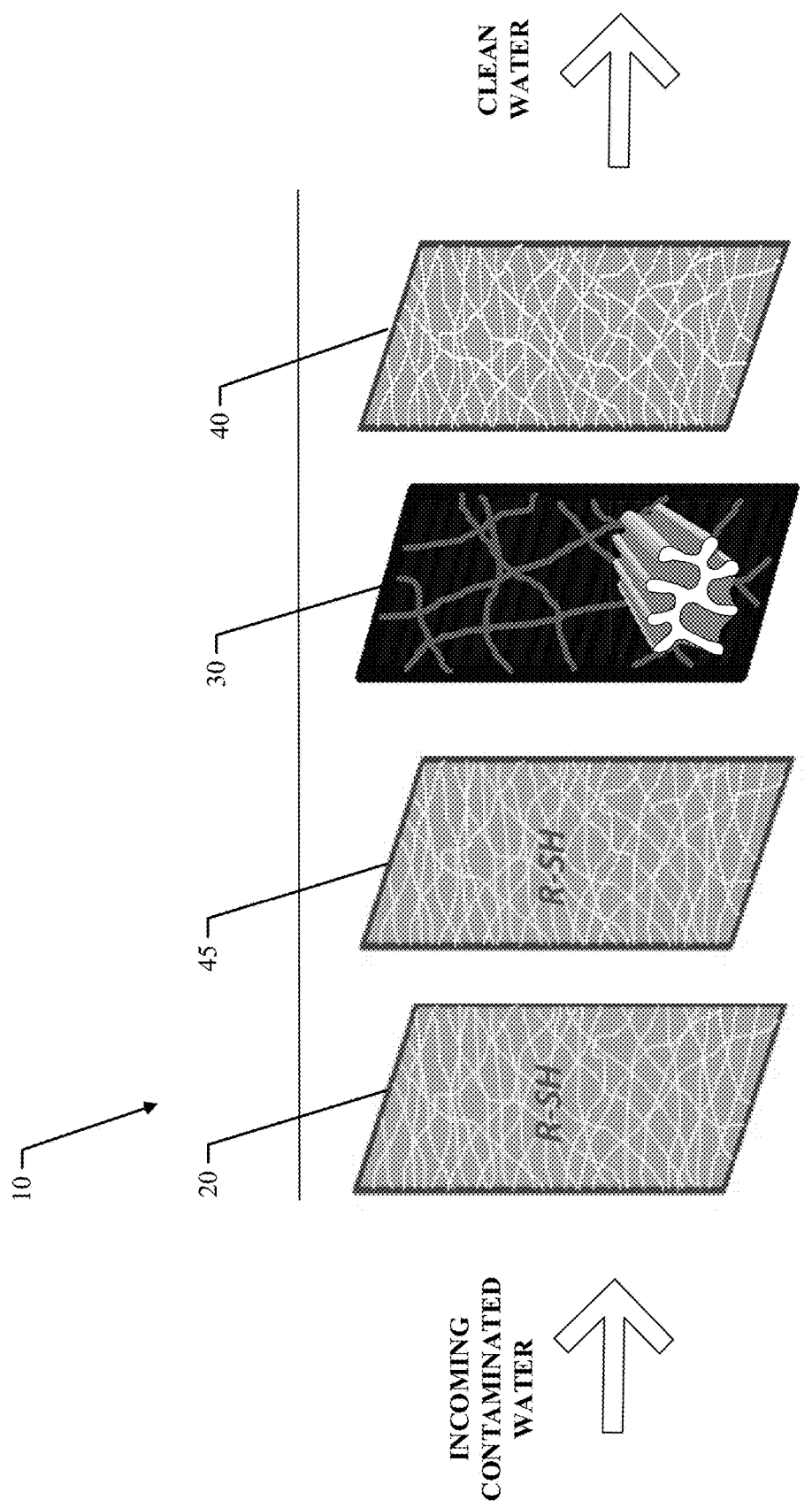
FIG. 9 illustrates an exploded view of the water purification device according to a further example embodiment.

FIG. 9 illustrates an exploded view of the water purification device 10 according to a further example embodiment. As shown in FIG. 9, in addition to including the heavy metal removal layer 20, the biological species removal layer 40, and the support layer 30 as described above, the water purification device 10 may also include a PFC removal layer 45. According to one example embodiment, the PFC removal layer 45 may be disposed proximate the heavy metal removal layer 20. In some cases, the PFC removal layer 45 may be disposed between the biological species removal layer 40 and the heavy metal removal layer 20. In other cases, the PFC removal layer 45 may be sandwiched between (i.e., located directly between, without other layers disposed between, the biological species removal layer 40 and the heavy metal removal layer 20). However, in other example embodiments, the PFC removal layer 45 may located on or proximate a first end of the water purification device 10 such that the contaminated water is first filtered through the PFC removal layer 45. However, according to further example embodiments, the contaminated water may be first filtered through the heavy metal removal layer 20 and then through the PFC removal layer 45.

The PFC removal layer 45 of the water purification device 10 may be configured to remove PFCs and/or heavy metal ions from the contaminated water. Accordingly, the PFC removal layer 45 may be configured in substantially the same manner as the heavy metal removal layer 20 described above. In some cases, when the water purification device 10 includes both a heavy metal removal layer 20 and a PFC removal layer 45, the PFC removal layer 45 may be configured to provide for the additional removal of heavy metal ions or PFCs that were perhaps not removed by the heavy metal removal layer 20. Accordingly, the PFC removal layer 45 may be situated in the water purification device 10 such that the contaminated water flows first through the heavy metal removal layer 20. In accordance with other example embodiments, however, the heavy metal removal layer 20 may be configured to remove only the heavy metal ions, and the PFC removal layer 45 may be configured to remove only PFCs.

Figure 10:
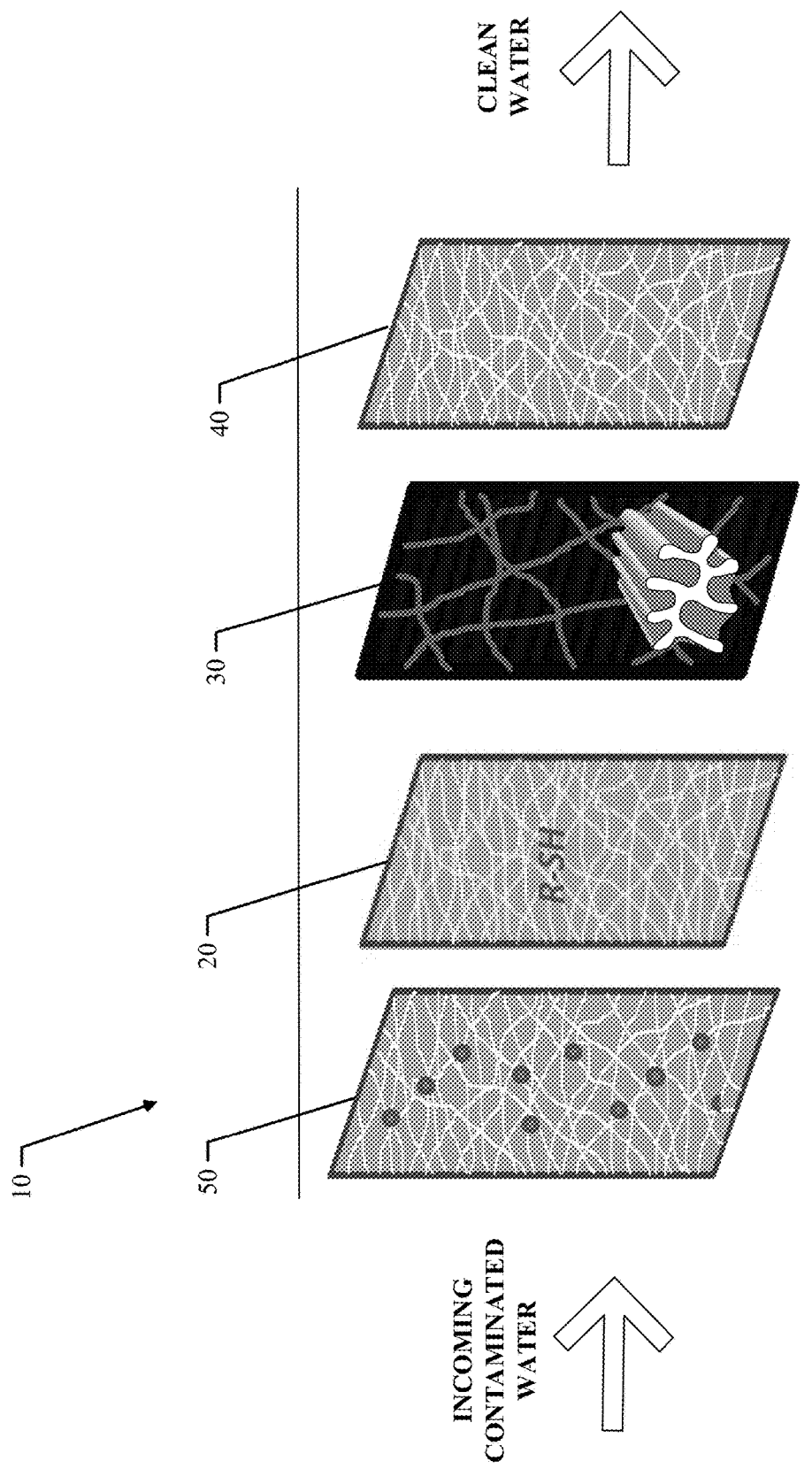
FIG. 10 illustrates an exploded view of the water purification device according to a further example embodiment.

FIG. 10 illustrates an exploded view of the water purification device according to a further example embodiment. As shown in FIG. 10, in addition to including the heavy metal removal layer 20, the biological species removal layer 40, and the support layer 30 as described above, the water purification device 10 may also include an anti-fouling layer 50. According to one example embodiment, the anti-fouling layer 50 may be provided on an end of the water purification device 10 such that the contaminated water flows first through the anti-fouling layer 50. Accordingly, the anti-fouling layer 50 may be proximate either of the heavy metal removal layer 20 or the biological species removal layer 40 such that the support layer 30 is sandwiched between the biological species removal layer 40 and the support layer 30. However, in other example embodiments, the support layer 30 may be located at an opposite end of the water purification device 10 from the anti-fouling layer 50, and the biological species removal layer 40 and the heavy metal removal layer 20 may be sandwiched between the support layer 30 and the anti-fouling layer 50.

The anti-fouling layer 50 may be configured to prevent fouling or clogging of the water purification device 10 and may be a nonwoven having nanoparticles embedded therein. The nonwoven of the anti-fouling layer 50, therefore, may include a randomly oriented or aligned collection of nanofibers. In some embodiments, for example, the nanofiber web of the anti-fouling layer 50 may be in the form of a thick and tangled mass defined by an open texture or porosity. According to certain embodiments, for instance, the nanofiber web of the anti-fouling layer 50 may be formed using an electrospinning production process. In such embodiments, the morphologies of the nanofiber web of the anti-fouling layer 50 may be arbitrarily controlled using different electrospinning settings. In other embodiments, for example, the nanofiber web of the anti-fouling layer 50 may be formed using a solid state polymer multilayer extrusion process.

In accordance with an example embodiment, the nanofiber web of the anti-fouling layer 50 may include polymer-based fibers. Accordingly, the nanofiber web of the anti-fouling layer 50 may include only one polymer or a blend of polymers. The polymer or blend of polymers may be a synthetic polymer such as poly(lactic acid) ("PLA"), poly (L-lactic acid) ("PLLA"), poly(lactic-co-glycolic acid) ("PLGA"), polycaprolactone ("PCL"), poly(ethylene oxide) ("PEO"), poly(ethylene terephthalate) ("PET"), poly(vinyl alcohol) ("PVA"), or any combination thereof. In certain embodiments, for example, the nanofiber web of the anti-fouling layer 50 may include PVA nanofibers.

Furthermore, the nanofiber web of the anti-fouling layer 50 may include a fiber diameter from about 5 nm to about 1000 nm. In further embodiments, for example, the nanofiber web of the anti-fouling layer 50 may include a fiber diameter from about 20 nm to about 700 nm. In other embodiments, for instance, the nanofiber web of the anti-fouling layer 50 may include a fiber diameter from about 100 nm to about 500 nm. In some embodiments, for example, the nanofiber web of the anti-fouling layer 50 may include a fiber diameter of about 100 nm. As such, in certain embodiments, the nanofiber web of the anti-fouling layer 50 may include a fiber diameter from at least about any of the following: 5, 10, 20, 50, and 100 nm and/or at most about 1000, 800, 700, 600, 500, and 100 nm (e.g., about 50-500 nm, about 100-800 nm, etc.).

Moreover, the nanofiber web of the anti-fouling layer 50 may include a plurality of pores (i.e., a pore structure) configured such that the anti-fouling layer 50 has a high specific surface area. Accordingly, the nanofiber web of the anti-fouling layer 50 may include a pore size from about 100 nm to about 7 μm. In further embodiments, for example, the nanofiber web of the anti-fouling layer 50 may include a pore size from about 20 nm to about 200 μm. In other embodiments, for instance, the nanofiber web of the anti-fouling layer 50 may include a pore size from about 100 nm to about 100 μm. In certain embodiments, for example, the nanofiber web of the anti-fouling layer 50 may include a pore size from about 500 nm to about 50 μm. As such, in certain embodiments, the nanofiber web of the anti-fouling layer 50 may include a pore size from at least about any of the following: 100, 200, 300, 400, and 500 nm and/or at most about 200, 100, 50, 3, and 1 μm (e.g., about 100 nm-1 μm, about 500 nm-1 μm, etc.).

In accordance with an example embodiment, the nanofiber web of the anti-fouling layer 50 may have a plurality of nanoparticles adhered onto a surface of the nanofiber web of the anti-fouling layer 50. In some cases, the nanoparticles may be any type of nanoparticles suitable for preventing the colonization of microbes on the surface of the nanofiber web, or preventing the attaching of microbes, both of which will decrease the tendency of the nanofiber surface from forming biofilms, or fouling. Accordingly, in some cases, the nanoparticles may be chitosan nanoparticles, silver nanoparticles, or copper nanoparticles, or any combination thereof. According to some example embodiments, the nanoparticles may cover 5% to 100% of the surface area of the nanofiber web of the anti-fouling layer 50. In other example embodiments, for example, the nanoparticles may cover 5% to 75% of the surface area of the nanofiber web of the anti-fouling layer 50. In other example embodiments, for example, the nanoparticles may cover 5% to 50% of the surface area of the nanofiber web of the anti-fouling layer 50. As such, in certain embodiments, the nanoparticles may cover from at least about any of the following: 5, 10, 20, 30, 40, or 50% of the surface area of the nanofiber web of the anti-fouling layer 50 and/or at most about any of the following: 100, 80, 75, 70, 60, or 50% of the surface area of the nanofiber web of the anti-fouling layer 50.

Moreover, the nanoparticles may form a nano-sized pattern on the surface of the nanofiber web of the anti-fouling layer 50 to further prevent the adhesion of particles to the surface the nanofiber web of the anti-fouling layer 50. The formation of these nanostructure on the surface of layer 50 will trap micro-size air bubbles which prevents the attachment of microbes in the water, thus reducing the fouling of the water purification device 10.

Figure 11:
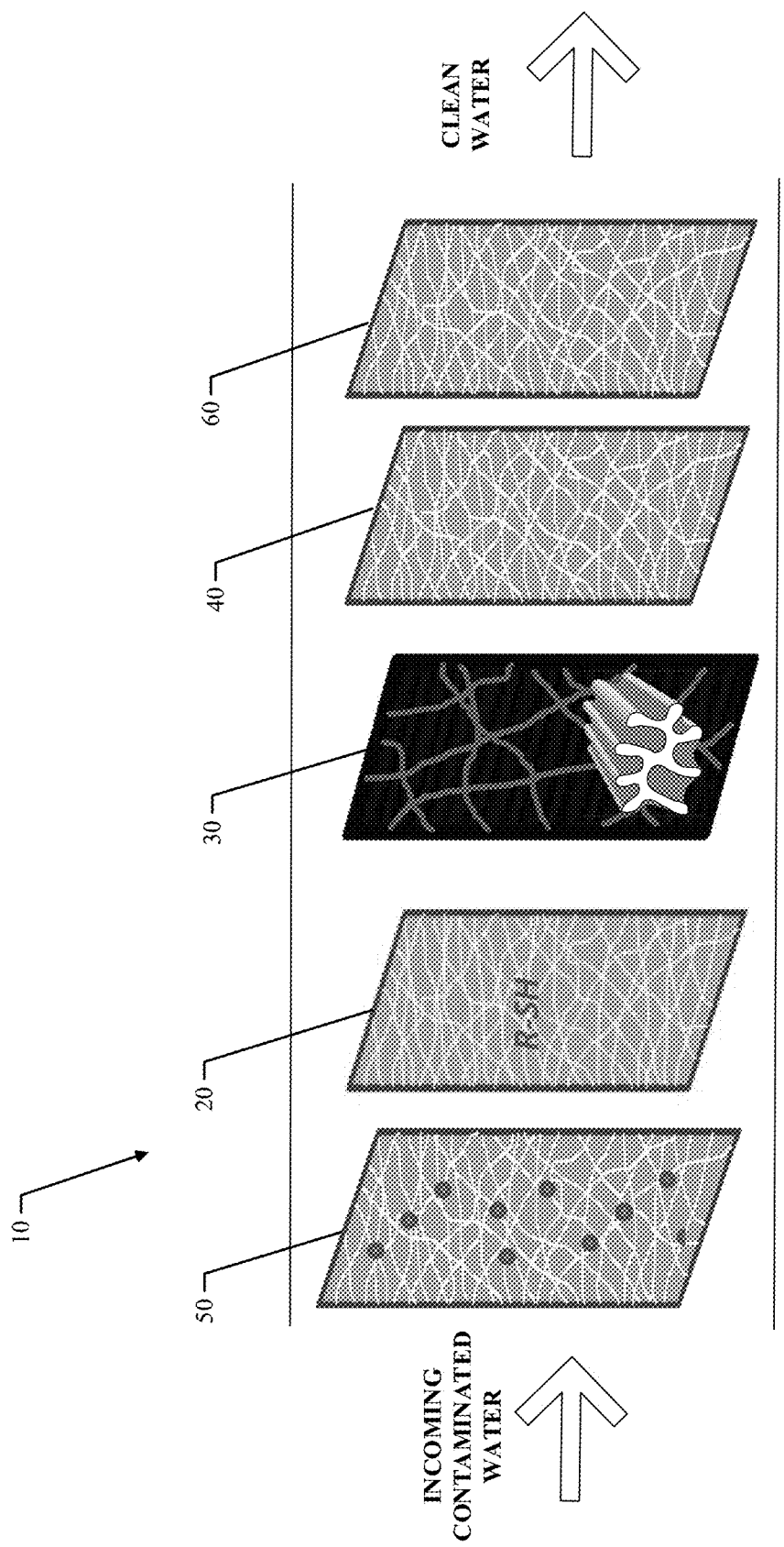
FIG. 11 illustrates an exploded view of the water purification device according to a further example embodiment.

FIG. 11 illustrates an exploded view of the water purification device 10 according to a further example embodiment. As shown in FIG. 11, in addition to including the heavy metal removal layer 20, the biological species removal layer 40, the support layer 30, and the anti-fouling layer 50 as described above, the water purification device 10 may also include an enhanced biological species removal layer 60. According to one example embodiment, the structure of the water purification device 10 may be similar to those described above (e.g., the anti-fouling layer 50 may be provided on an end of the water purification device 10 such that the contaminated water flows first through the anti-fouling layer 50, where the anti-fouling layer 50 may be proximate either of the heavy metal removal layer 20 or the biological species removal layer 40 such that the support layer 30 is sandwiched between the biological species removal layer 40 and the heavy metal removal layer 20). However, the enhanced biological species removal layer 60 may be provided in the water purification device 10 in a manner such that the contaminated water flows first through the biological species removal layer 40. For example, the enhanced biological species removal layer 60 may be provided on an end of the water purification device 10 opposite from the anti-fouling layer 50, or in some cases, proximate the biological species layer 40, as long as the contaminated water flows first through the biological species removal layer 40.

The enhanced biological species removal layer 60 may be configured to further provide for the additional removal of biological species that were perhaps not removed by the biological species layer 40. Moreover, the enhanced biological species removal layer 60 may be in the form of a nonwoven layer. The nonwoven of enhanced biological species removal layer 60, therefore, may include a randomly oriented or aligned collection of nanofibers. In some embodiments, for example, the nanofiber web of the enhanced biological species removal layer 60 may be in the form of a thick and tangled mass defined by an open texture or porosity. According to certain embodiments, for instance, the nanofiber web of the enhanced biological species removal layer 60 may be formed using an electrospinning production process. In such embodiments, the morphologies of the nanofiber web of the enhanced biological species removal layer 60 may be arbitrarily controlled using different electrospinning settings. In other embodiments, for example, the nanofiber web of the enhanced biological species removal layer 60 may be formed using a solid state polymer multilayer extrusion process.

In accordance with an example embodiment, the nanofiber web of the enhanced biological species removal layer 60 may include polymer-based fibers. Accordingly, the nanofiber web of the enhanced biological species removal layer 60 may include only one polymer or a blend of polymers. The polymer or blend of polymers may be a synthetic polymer such as poly(lactic acid) ("PLA"), poly(L-lactic acid) ("PLLA"), poly(lactic-co-glycolic acid) ("PLGA"), polycaprolactone ("PCL"), poly(ethylene oxide) ("PEO"), poly(ethylene terephthalate) ("PET"), poly(vinyl alcohol) ("PVA"), or any combination thereof. In certain embodiments, for example, the nanofiber web of the enhanced biological species removal layer 60 may include PET nanofibers.

Furthermore, the nanofiber web of the enhanced biological species removal layer 60 may include a fiber diameter from about 10 nm to about 100 μm (i.e., 100,000 nm). In further embodiments, for example, the nanofiber web of the enhanced biological species removal layer 60 may include a fiber diameter from about 100 nm to about 50 μm (i.e., 50,000 nm). In other embodiments, for instance, the nanofiber web of the enhanced biological species removal layer 60 may include a fiber diameter from about 250 nm to about 750 nm. In some embodiments, for example, the nanofiber web of the enhanced biological species removal layer 60 may include a fiber diameter of about 500 nm. As such, in certain embodiments, the nanofiber web of the enhanced biological species removal layer 60 may include a fiber diameter from at least about any of the following: 80, 100, 250, 300, 400, and 500 nm and/or at most about 100,000, 50,000, 10,000, 1,000, 750, 700, 600, and 500 nm (e.g., about 100-700 nm, about 400-600 nm, etc.).

Moreover, the nanofiber web of the enhanced biological species removal layer 60 may include a plurality of pores (i.e., a pore structure) configured to remove any biological species that was perhaps not removed by the biological species removal layer 40. Accordingly, the nanofiber web of the of the enhanced biological species removal layer 60 may include a pore size that is configured to filter those biological species that may be likely to have not been removed by the biological species layer 40. Accordingly, the nanofiber web of the of the enhanced biological species removal layer 60 may include a pore size from about 10 nm to about 7 μm. In further embodiments, for example, the nanofiber web of the enhanced biological species removal layer 60 may include a pore size from about 100 nm to about 6 μm. In other embodiments, for instance, the nanofiber web of the enhanced biological species removal layer 60 may include a pore size from about 300 nm to about 5 μm. In certain embodiments, for example, the nanofiber web of the enhanced biological species removal layer 60 may include a pore size from about 500 nm to about 1 μm. As such, in certain embodiments, the nanofiber web of the enhanced biological species removal layer 60 may include a pore size from at least about any of the following: 100, 200, 300, 400, and 500 nm and/or at most about 7, 6, 5, 3, and 1 μm (e.g., about 100 nm-1 μm, about 500 nm-1 μm, etc.).

Figure 12:
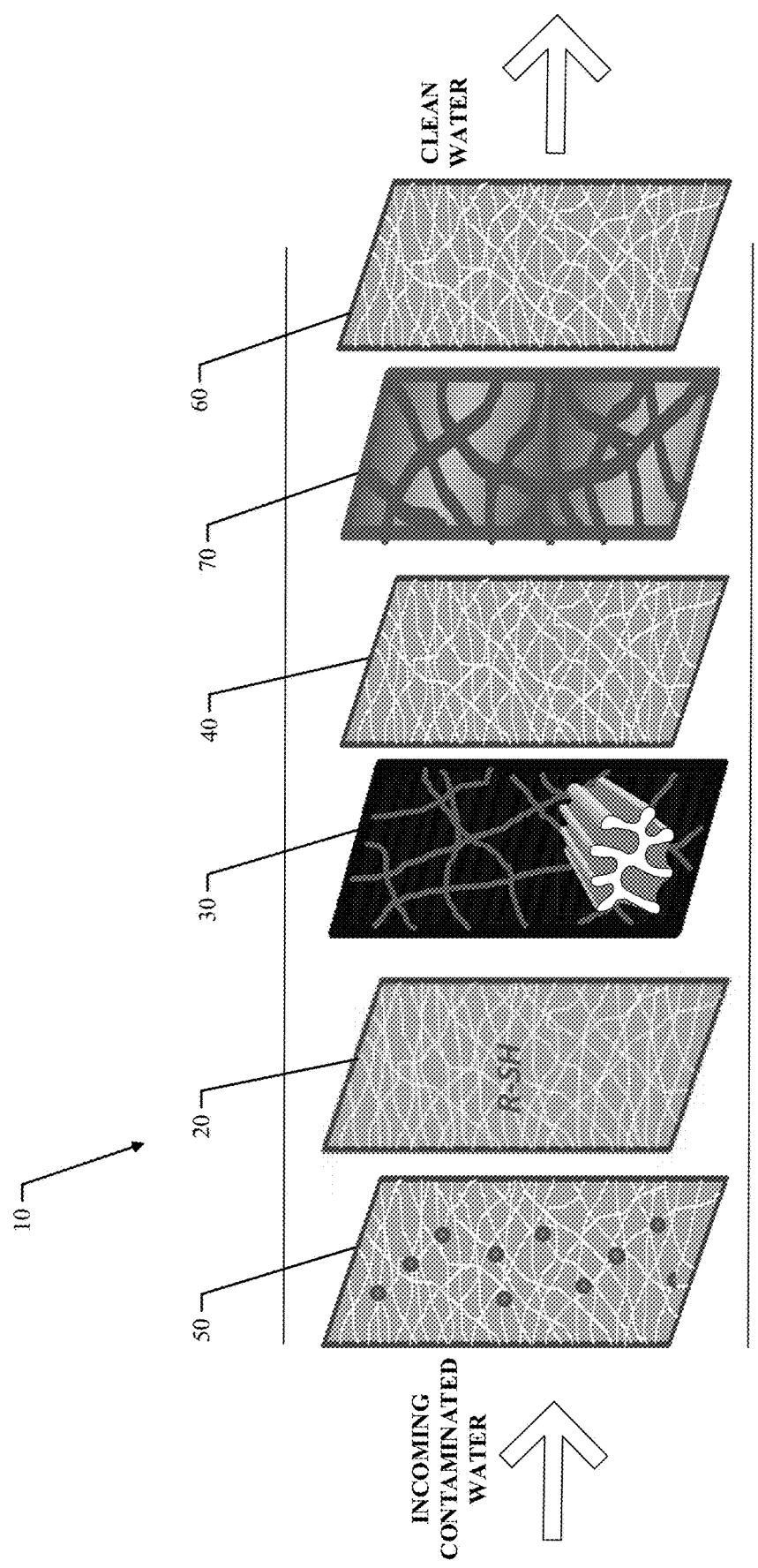
FIG. 12 illustrates an exploded view of the water purification device according to a further example embodiment.

FIG. 12 illustrates an exploded view of the water purification device 10 according to a further example embodiment. As shown in FIG. 12, in addition to including the heavy metal removal layer 20, the biological species removal layer 40, the support layer 30, the anti-fouling layer 50, and the enhanced biological species removal layer 60 as described above, the water purification device 10 may also include a second support layer 70. According to one example embodiment, the structure of the water purification device 10 may be similar to those described above (e.g., the anti-fouling layer 50 may be provided on an end of the water purification device 10 such that the contaminated water flows first through the anti-fouling layer 50, where the anti-fouling layer 50 may be proximate either of the heavy metal removal layer 20 or the biological species removal layer 40 such that the support layer 30 is sandwiched between the biological species removal layer 40 and the heavy metal removal layer 20). However, in cases where the second support layer 70 is provided in the water purification device 10, the second support layer 70 may be sandwiched between the heavy metal removal layer 20 and the enhanced biological species removal layer 60, as shown in FIG. 12. In other cases, for example, the second support layer 70 may be provided on an opposite end of the water purification device 10 from the anti-fouling layer 50.

The second support layer 70 may be configured to provide additional support and structure to the water purification device 10. In such embodiments, for instance, the second support layer 70 may be a nonwoven that includes a randomly oriented or aligned collection of microfibers. In some embodiments, the nonwoven second support layer 70 may include a randomly oriented or aligned collection of microfibers. In some embodiments, for example, the microfiber web of the second support layer 70 may be in the form of a thick and tangled mass defined by an open texture or porosity.

In accordance with an example embodiment, the microfiber web of the second support layer 70 may be formed in a similar manner as the support layer 30. For example, the support layer 70 may include polymer-based fibers or a combination of polymer and glass fibers. Furthermore, the microfiber web of the second support layer 70 may include a fiber diameter from about 0.5 μm to about 200 μm. In further embodiments, for example, the microfiber web of the second support layer 70 may include a fiber diameter from about 0.5 μm to about 100 μm. In other embodiments, for instance, the microfiber web of the second support layer 70 may include a fiber diameter from about 1 μm to about 50 μm. In some embodiments, for example, the microfiber web of the second support layer 70 may include a fiber diameter of about 5 μm. As such, in certain embodiments, the microfiber web of the second support layer 70 may include a fiber diameter from at least about any of the following: 0.5, 1, 10, 20, 30, 40, and 50 μm and/or at most about 200, 100, 80, 70, 60, and 50 μm.

Moreover, the microfiber web of the second support layer 70 may include a plurality of pores (i.e., a pore structure) configured allow the water to pass through. In some cases, the plurality of pores may have a relatively large pore size thus resulting in a high specific surface area. The microfiber web of the second support layer 70 may include a pore size from about 100 nm to about 200 μm. In further embodiments, for example, the microfiber web of the second support layer 70 may include a pore size from about 200 nm to about 100 μm. In other embodiments, for instance, the microfiber web of the second support layer 70 may include a pore size from about 300 nm to about 10 μm. In certain embodiments, for example, the microfiber web of the second support layer 70 may include a pore size from about 500 nm to about 1 μm. As such, in certain embodiments, the microfiber web of the second support layer 70 may include a pore size from at least about any of the following: 100, 200, 300, 400, 500, and 1000 nm and/or at most about 200, 100, 50, 40, 30, 20, 10 and 1 μm (e.g., about 100 nm-1 μm, about 500 nm-1 μm, etc.).

It should be understood that the water purification device 10, as described herein, may contain a heavy metal removal layer 20, a support layer 30, and a biological species removal layer 40. However, the water purification device 10 may additionally include, alone or in any combination, the PFC removal layer 45, the anti-fouling layer 50, the enhanced biological species removal layer 60, or the second support layer 70.

Example embodiments therefore represent a water purification device that may include a heavy metal removal layer configured to remove heavy metal ions from contaminated water. The water purification device may further include a biological species removal layer configured to remove biological species from the contaminated water and a support layer configured to provide support for the water purification device.

In some embodiments, additional optional structures and/or features may be included or the structures/features described above may be modified or augmented. Each of the additional features, structures, modifications, or augmentations may be practiced in combination with the structures/features above and/or in combination with each other. Thus, some, all or none of the additional features, structures, modifications, or augmentations may be utilized in some embodiments. Some example additional optional features, structures, modifications, or augmentations are described below, and may include, for example, that the support layer is disposed between the heavy metal removal layer and the biological species removal layer. Alternatively or additionally, the heavy metal removal layer may include a nanofiber web having a functional group bonded thereto, wherein the functional group is configured to attract and bond heavy metal ions. In some cases, the functional group may be a thiol functional group. In other example embodiments, the thiol functional group may include thiol-ethanol. Alternatively or additionally, the nanofiber web of the heavy metal removal layer may include at least polyethylene terephthalate. Alternatively or additionally, the biological species removal layer may include a plurality of positively-charged nano-whiskers. In some cases, the positively-charged nano-whiskers may be aluminum oxide hydroxide nano-whiskers. In further example embodiments, the aluminum oxide hydroxide nano-whiskers are in boehmite form. Alternatively or additionally, the support layer may include a microfiber web. In some cases, the microfiber web of the support layer may include deep groove microfibers. In some cases, the deep groove microfibers may be micron-sized deep groove microfibers. Alternatively or additionally, the water purification device may further include an anti-fouling layer configured to prevent clogging of the water purification device. In some cases, the anti-fouling layer may be located on a first end of the water purification device such that the contaminated water flows first through the anti-fouling layer. Alternatively or additionally, the anti-fouling layer may include a nanofiber web with nanoparticles embedded therein, where the nanoparticles are configured to prevent adhesion of particles from the contaminated water onto the first end of the water purification device. In some cases, the nanoparticles are chitosan nanoparticles. Alternatively or additionally, the nanofiber web of the anti-fouling layer may include at least polyvinyl alcohol. Alternatively or additionally, the water purification device may further include an enhanced biological species removal layer configured to remove biological species not removed via the biological species removal layer, where the biological species removal layer may be positioned in the water purification device such that the contaminated water flows first through the biological species removal layer before flowing through the enhanced biological species layer. Alternatively or additionally, the heavy metal removal layer may be further configured to remove perfluorinated compounds from the contaminated water. Alternatively or additionally, the water purification device may further include a perfluorinated compound removal layer configured to remove heavy metal ions and perfluorinated compounds not removed via the heavy metal removal layer, wherein the heavy metal removal layer is positioned in the water purification device such that the contaminated water flows first through the heavy metal removal layer before flowing through the perfluorinated compound removal layer.

Many modifications and other embodiments of the water purification device set forth herein will come to mind to one skilled in the art to which these inventions pertain having the benefit of the teachings presented in the foregoing descriptions and the associated drawings. Therefore, it is to be understood that the water purification device is not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed is:

1. A water purification device comprising:
    a heavy metal removal layer configured to filter heavy metal ions and perfluorinated compounds from contaminated water, the heavy metal removal layer comprising a nanofiber web having a functional group bonded thereto, wherein the functional group is configured to attract and bond the heavy metal ions, and wherein the nanofiber web comprises a plurality of nanofiber pores, each of the plurality of nanofiber pores having a nanofiber pore size from 100 nanometers to 50,000 nanometers;
    a biological species removal layer configured to filter biological species from the contaminated water; and
    a support layer configured to provide support for the water purification device and comprising a microfiber web, the microfiber web comprising a plurality of microfiber pores, wherein each of the plurality of microfiber pores has a microfiber pore size of 2 nanometers to 7,000 nanometers.

2. The water purification device according to claim 1, wherein the support layer is disposed between the heavy metal removal layer and the biological species removal layer.

3. The water purification device according to claim 1, wherein the functional group is a thiol or a mercaptan functional group.

4. The water purification device according to claim 1, wherein the nanofiber web comprises at least polyethylene terephthalate.

5. The water purification device according to claim 1, wherein the biological species removal layer comprises a plurality of positively-charged nano-whiskers.

6. The water purification device according to claim 5, wherein the positively-charged nano-whiskers are aluminum oxide hydroxide nano-whiskers.

7. The water purification device according to claim 6, wherein the aluminum oxide hydroxide nano-whiskers are in boehmite form.

8. The water purification device according to claim 1, wherein the microfiber web comprises deep groove microfibers.

9. The water purification device according to claim 8, wherein the deep groove microfibers are micron-sized deep groove microfibers.

10. The water purification device according to claim 1, wherein the water purification device further comprises an anti-fouling layer configured to prevent clogging of the water purification device.

11. The water purification device according to claim 10, wherein the anti-fouling layer is located on a first end of the water purification device such that the contaminated water flows first through the anti-fouling layer.

12. The water purification device according to claim 10, wherein the anti-fouling layer comprises a nanofiber web with nanoparticles embedded therein, wherein the nanoparticles are configured to prevent adhesion of particles from the contaminated water onto the first end of the water purification device.

13. The water purification device according to claim 12, wherein the nanoparticles are chitosan nanoparticles.

14. The water purification device according to claim 12, wherein the nanofiber web is comprised of at least polyvinyl alcohol.

15. The water purification device according to claim 1, wherein the water purification device further comprises an enhanced biological species removal layer configured to filter biological species not filtered via the biological species removal layer, wherein the biological species removal layer is positioned in the water purification device such that the contaminated water flows first through the biological species removal layer before flowing through the enhanced biological species layer.

16. The water purification device according to claim 1, wherein the water purification device further comprises a perfluorinated compound removal layer configured to filter heavy metal ions and perfluorinated compounds not filtered via the heavy metal removal layer, wherein the heavy metal removal layer is positioned in the water purification device such that the contaminated water flows first through the heavy metal removal layer before flowing through the perfluorinated compound removal layer.

17. The water purification device according to claim 1, wherein the nanofiber pore size is from 500 nanometers to about 1000 nanometers.

* * * * *